United States Patent
Fernandez

(10) Patent No.: US 6,760,841 B1
(45) Date of Patent: Jul. 6, 2004

(54) METHODS AND APPARATUS FOR SECURELY CONDUCTING AND AUTHENTICATING TRANSACTIONS OVER UNSECURED COMMUNICATION CHANNELS

(75) Inventor: Alberto J. Fernandez, Miami, FL (US)

(73) Assignee: XTec, Incorporated, Miami, FL (US)

( * ) Notice: Subject to any disclaimer, the term of this patent is extended or adjusted under 35 U.S.C. 154(b) by 0 days.

(21) Appl. No.: 09/563,448

(22) Filed: May 1, 2000

(51) Int. Cl.[7] .............................. H04L 9/32; G06F 17/60
(52) U.S. Cl. .......................... 713/172; 713/185; 705/55; 705/65
(58) Field of Search ................................. 713/172, 185, 713/200, 201; 705/55, 64, 66, 67, 72, 73; 380/247

(56) References Cited

U.S. PATENT DOCUMENTS

| | | | | |
|---|---|---|---|---|
| 5,282,249 A | * | 1/1994 | Cohen et al. | 380/229 |
| 5,499,297 A | * | 3/1996 | Boebert | 713/159 |
| 5,781,723 A | * | 7/1998 | Yee et al. | 713/200 |
| 6,556,680 B1 | * | 4/2003 | Leonardi | 380/247 |

* cited by examiner

Primary Examiner—Justin T. Darrow
(74) Attorney, Agent, or Firm—Priest & Goldstein, PLLC

(57) ABSTRACT

A transaction processing system employs an authentication device which receives identifying and authentication information from a token such as a credit or debit card. The authentication device forms an information block comprising the identifying and authentication information and encrypts the information block using a preprogrammed key. The information block is transferred to a transaction terminal such as a merchant terminal or customer computer and subsequently transferred to an authorizing server. The authorizing server transfers the information block to an authenticating server, which decrypts the information block, extracts the identifying and authentication information and compares the identifying and authentication information against similar information accessible to the authenticating server. The authenticating server instructs the authorizing server to accept or reject the transaction based on the result of the comparison. Alternatively, a self-authenticating token may be employed in which authentication information characteristic of the token is converted to a numerical format, encrypted and stored on the token. The authentication device decrypts the numerical representation of the authentication information and compares it against the actual authentication information. The authentication device accepts or rejects the transaction based on the result of the comparison.

16 Claims, 7 Drawing Sheets

METHODS AND APPARATUS FOR SECURELY CONDUCTING AND AUTHENTICATING TRANSACTIONS OVER UNSECURED COMMUNICATION CHANNELS

CROSS-REFERENCE TO RELATED APPLICATIONS

Fernandez U.S. Pat. No. 5,616,904 issued Apr. 1, 1997, Fernandez U.S. Pat. No. 5,644,636 issued Jul. 1, 1997, and Provisional Application No. 60/180,372 filed Feb. 2, 2000, all assigned to the assignee of the present invention, address related subject matter and are incorporated by reference herein in their entirety.

FIELD OF THE INVENTION

The present invention relates generally to improvements to transaction processing. More particularly, the invention relates to techniques for authentication and protection of transaction information in transactions conducted over insecure communication channels.

BACKGROUND OF THE INVENTION

The use of electronic devices and communication in financial transactions has grown phenomenally in recent years. Electronic devices and communications are commonly used to authorize transactions, and are also used more and more in electronic commerce, especially commerce conducted over the Internet. Electronic transaction authorization typically involves the submission by a merchant of information taken from an identifying token presented by the customer, such as the customer's credit or debit card. The merchant submits the customer's credit or debit card information to a bank computer and the bank computer's debiting the customer's account and authorizing the transaction. Internet commerce transactions typically involve the use of a credit or debit card, with a customer linking to a merchant web site and entering credit card information or debit card information on a form provided by the web site for transmission to a merchant server. The merchant server submits the received credit card information to a bank or other credit card processing agency server in the same way as is done for a conventional credit card transaction.

In the present state of the art, the conduct of financial transactions is fraught with risks for both the merchant and the customer. This is true both in a conventional transaction where a customer submits a credit or debit card to the merchant and even more in the case of electronic commerce conducted over the Internet. For the merchant, there is little or no assurance that a credit or debit card used in a transaction is not stolen or being used in an unauthorized way. In a conventional transaction where the customer physically submits the card to the merchant, a risk exists for the merchant that the card is stolen or counterfeit, and for the customer there is a risk that the customer's card information will be stolen by the merchant, intercepted from the merchant's reader, or intercepted in transit from the merchant's reader to a bank computer. In an Internet transaction, the merchant has little or no assurance that the person conducting the transaction is in possession of the credit card whose information is being submitted. For the customer in an Internet transaction, it cannot be certain that the merchant web site is a legitimate web site, rather than a false front used to collect credit card information. Even if the web site is a legitimate web site, the customer has no assurance that the web site has not been surreptitiously reprogrammed by outsiders so as to redirect traffic to another location in order to collect credit card data submitted to the web site. If the intended web site has received the data, the customer has no assurance that attackers will not obtain personal information such as credit card information which is stored in the web site's servers.

Public key cryptography is commonly used to protect sensitive information during Internet transactions. A merchant server sends a public key to a customer's browser. The browser then uses the public key to encrypt the customer's data and sends the data in encrypted format to the merchant server. The merchant server then uses its private key to decrypt the data for use.

Public key cryptography protects data in transit, but is less effective as a protection against sending data to undesired destinations. A web site using public key cryptography typically presents a digital certificate to a customer's browser, but only the most experienced computer users know how to verify a certificate's digital signature. Moreover, if a web site is set up for the purpose of obtaining credit card information, the web site may well have a genuine certificate and be able to present the certificate during the transaction. Furthermore, the use of public key cryptography offers no assurance to a merchant that credit card information being submitted comes from a credit card held by the submitter, rather than from a copied card or from credit card information collected or intercepted by the submitter.

It may be possible for a user to be provided with a device to read credit card information. However, prior art credit card readers are not adapted to establish that a card is authentic and not a copy. Moreover, if a credit card or debit card reader is placed in the physical possession of a user, the user is free to attack the reader at leisure so that it will operate in unauthorized ways. For example, a user may reconfigure a reader to report reading of a credit card and output purported credit card information, even when no credit card has been submitted to the reader at all. Furthermore, conventional card readers do not provide assurance that a card is genuine and not a counterfeit.

Moreover, credit card readers of the prior art output credit card information in plaintext and do not provide security for the user's credit card information. Even if the information is encrypted in transit, the merchant will receive the information in plaintext at the end of the transmission. A typical card reader thus provides no security for the user against an unscrupulous merchant or against an attack on a merchant's file of card data.

Similar problems exist with merchant processing terminals used at retail locations. Merchant card readers are susceptible to being attacked to allow theft of card information. Moreover, merchant card readers of the prior art are not equipped to identify a credit card as a counterfeit.

There exists, therefore, a need in the art for a system which will provide reliable authentication of a financial document such as a credit or debit card, and which will protect the privacy of the user's data.

SUMMARY OF THE INVENTION

A system according to the present invention reliably authenticates the existence and presentation of a genuine financial document such as a credit or debit card and allows the card information to be submitted securely to an issuing authority such as a bank for transaction approval. The card information is not presented directly to a merchant. Instead, an encrypted information block containing encrypted card information is provided to the merchant. The card information is not seen or known by the merchant, nor is the card information available while being transmitted. The information block is transmitted to a computer controlled by an authority which issued the card, and which has the necessary keys to decrypt the information block and retrieve and authenticate the card information. Once the card is authenticated, the merchant receives a transaction authorization, but has no opportunity to see or compromise the card information.

One aspect of the present invention is a system for reliably authenticating the presentation of a genuine financial document such as a credit or debit card and for securely transmitting the financial information contained on the card together with financial transaction details in order to verify a transaction. A customer initiates a financial transaction, for example by beginning an ordering process for ordering a book over the Internet. The merchant server presents a transaction form to the customer. The transaction form may suitably contain a product number, price and description, with space for the customer to enter information such as shipping information. The transaction form may provide an instruction for the customer to insert a token into an authentication device attached to the customer's computer. The token may be a financial identification card such as a credit card or debit card, or may alternatively be an identification card issued by an individual bank.

The authentication device reads the card information and authenticates the card. The authentication device also stores information such as time and date, as well as information received from the customer's computer such as transaction details including the dollar amount of the transaction. The authentication device may also receive biometric information such as a customer signature. The authentication device stores the information received in an information block and encrypts the information block using a preprogrammed secure encryption key. The authentication device provides the information block to the customer's computer, which transmits the information block to the merchant. The merchant forwards the information block to the merchant's bank, and the information block is eventually forwarded to a server controlled by the authority which issued the authentication device. The issuing authority server decrypts the information block using the encryption key and examines the data in the information block. If the issuing bank approves the transaction, payment is made or authorized to the merchant. If the issuing authority server rejects the transaction, a notice is sent to the merchant that the transaction has been rejected.

The authentication device is tamperproof and is adapted to obtain information needed to identify a card as genuine or counterfeit. Because the authentication device is tamperproof and is programmed with an encryption key by the issuing authority, the information block produced by the authentication device can be trusted when received by the issuing authority, even if the information block is not sent over a secure channel. Similarly, because the information block is encrypted by a tamperproof device using a key controlled by the issuing authority, the information block is protected from compromise even when sent over an insecure channel.

A more complete understanding of the present invention, as well as further features and advantages of the invention, will be apparent from the following Detailed Description and the accompanying drawings.

DETAILED DESCRIPTION

Figure 1:
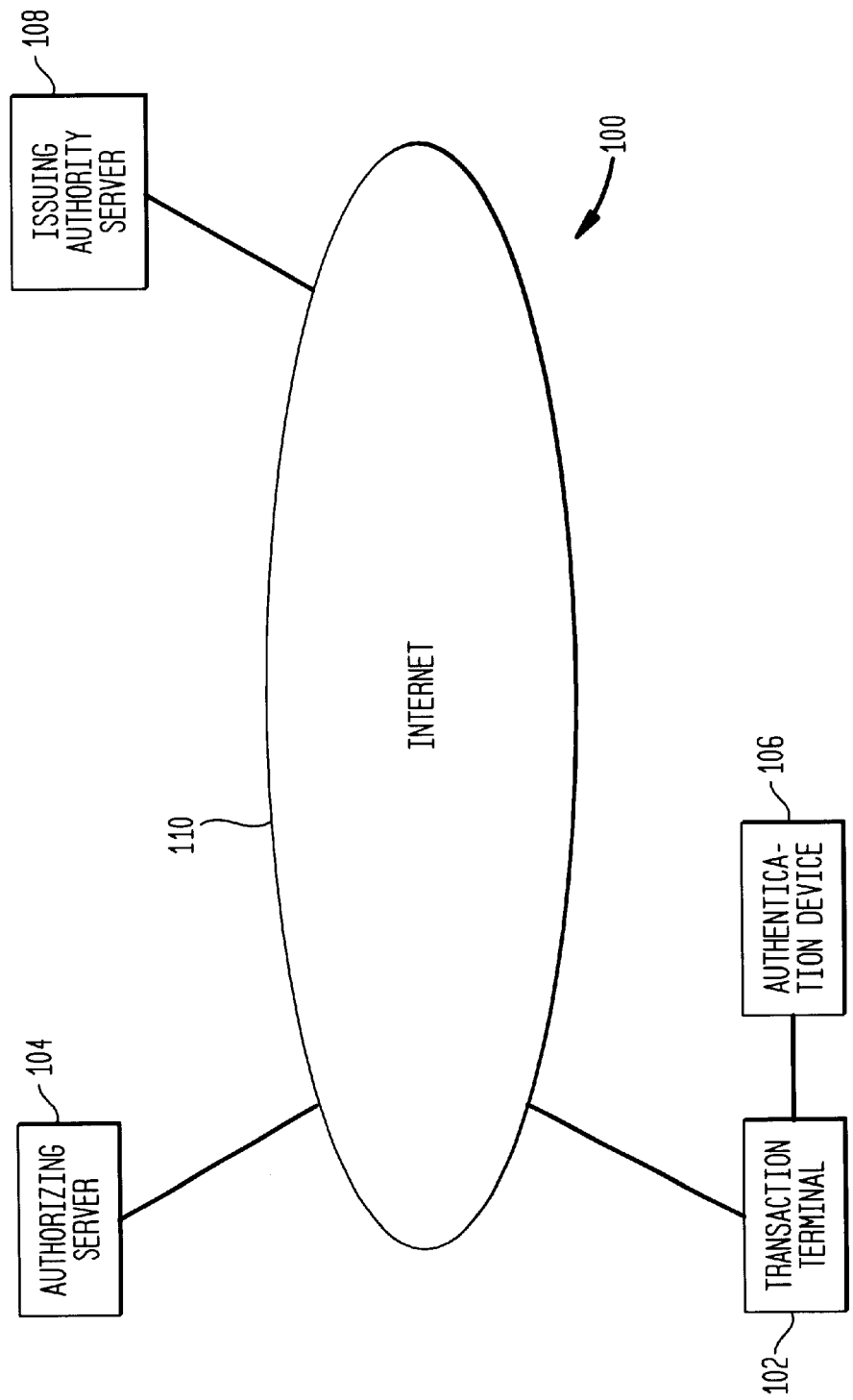
FIG. 1 illustrates a secure transaction processing system for performing transaction processing and authentication over an insecure communication channel according to the present invention.

FIG. 1 illustrates a system 100 for conducting a secure transaction over an insecure communication channel. The system 100 include a transaction terminal 102. The transaction terminal 102 is equipped to transfer information to an authorizing server 104. The transaction terminal 102 also communicates with an authentication device 106. The authentication device 106 is tamperproof, preferably employing a mediametric encryption key created by obtaining and processing numerical representations of trapped charge levels in cells of a semiconductor memory array. The mediametric encryption key is secure from compromise because any attempt which is made from outside the device to detect charge levels of the memory cells will result in alteration of the charge levels of the memory cells. An internal mediametric key is created within the authentication device 106 and is used to encrypt an external key provided by an issuing authority. The external key is stored only when encrypted by the internal mediametric key and is therefore immune from compromise. It is therefore impossible to store unauthorized information in the authentication device 106, because a person attempting to store such information will not be able to obtain the external encryption key needed to encrypt the information. If an issuing authority receives information which has not been encrypted with the correct key, the issuing authority will know that the information is not genuine. Further details of mediametric encryption techniques are described in the Fernandez Provisional Application Serial No. 60/180,372 cited above. Because of the difficulty of obtaining the encryption key from the authentication device 106, the authentication device 106 can be given to a user such as a customer or merchant without fear that it will be attacked and reconfigured to provide an unauthorized authentication or to otherwise conduct an unauthorized transaction.

When it is desired to conduct a transaction, transaction information is entered using the terminal 102. The transaction information is provided to the authentication device 106. A token such as a credit or debit card is placed in the authentication device 106 for reading and authentication. The authentication device 106 reads identifying information from the token. At the same time, the authentication device reads authentication information from the token. The authentication information is preferably mediametric information based on physical characteristics of the token which may be precisely read but difficult or impossible to write or copy predictably. These characteristics include positioning of magnetic transitions on a magnetic stripe card or levels of trapped charges of cells of a semiconductor memory array. The mediametric characteristics can be used to create a "fingerprint" of a device such as a magnetic card or a semiconductor memory. The fingerprint can be stored in a location accessible to an issuing authority server 108. Then, when the card is submitted for a transaction, the mediametric characteristics of the card which is submitted can be measured or examined and used for comparison against the stored mediametric fingerprint. Mediametric authentication techniques for magnetic devices are disclosed in the Fernandez U.S. Pat. Nos. 5,235,166, 5,430,279 and 5,616,904 cited above, and mediametric authentication techniques for semiconductor devices are disclosed in the Fernandez U.S. Pat. No. 5,655,636 cited above. The authentication device 106 assembles an information block including the transaction information, the token identifying information, the token authentication information and a date and time stamp. The authentication device 106 then encrypts the information block using the key stored in the authentication device 106 and passes it to the terminal 102. Because the information block is encrypted by the authentication device 106, the information block cannot be read from the terminal 102. Moreover, because the authentication device 106 is tamperproof and because the encryption key cannot be extracted from the authentication device 106, the information block can be identified as authentic upon arrival at its destination, because it was encrypted with the correct key.

Once the information block is received at the terminal 102, the terminal 102 passes the information block to the authorizing server 104. The authorizing server 104 passes the information block to an issuing authority server 108, controlled by an authority which issued the authentication device 106. The issuing authority server 108 has access to the key used by the authentication device 106 to encrypt the information block. The issuing authority server 108 decrypts the information block and extracts the identification, authentication and transaction information from the information block. The issuing authority server 108 may have access to stored authentication information to be used to authenticate the token. In that case, the issuing authority server 108 compares the authentication information read from the card against the stored authentication information. If the received authentication information matches the stored authentication information, the issuing authority server 108 approves the transaction and passes approval instructions to the authorizing server 104. The authorizing server 104 then issues a transaction authorization to the transaction terminal 102.

The transaction terminal 102, authorizing server 104 and issuing authority server 108 are shown here as communicating over the Internet 112. The Internet 112 is shown here as the communication channel because it is inexpensive and convenient to use, but also notoriously insecure. It will be recognized, however, that any desired communication channel may be used.

If desired, it is possible for a card to be self-authenticating. In this case, a numerical representation of the authentication information is encrypted and stored on the card. The encryption key used to encrypt the numerical representation of the authentication information is securely maintained and accessible to the issuing authority server 108. In this case, the information block includes transaction information, identification information, authentication information and the encrypted numerical representation of the authentication information. Upon arrival at the issuing authority server 108, the information block is decrypted and the numerical representation of the authentication information is also decrypted. The authentication information read from the card is compared with the numerical authentication information in order to authenticate the card. If this technique is used, the issuing authority server 108 does not need to have access to the stored authentication information for each card. The issuing authority server 108 can be used to authenticate cards from a number of issuers without a need for each issuer of a card to provide authentication information to the issuing authority server 108.

Alternatively, the numerical authentication information can be encrypted with a key stored in the authentication device 106. In that case, the authentication device 106 can perform authentication on the card and provide an authentication certificate which is supplied to the terminal 102 without a need to provide actual authentication information.

Figure 2:
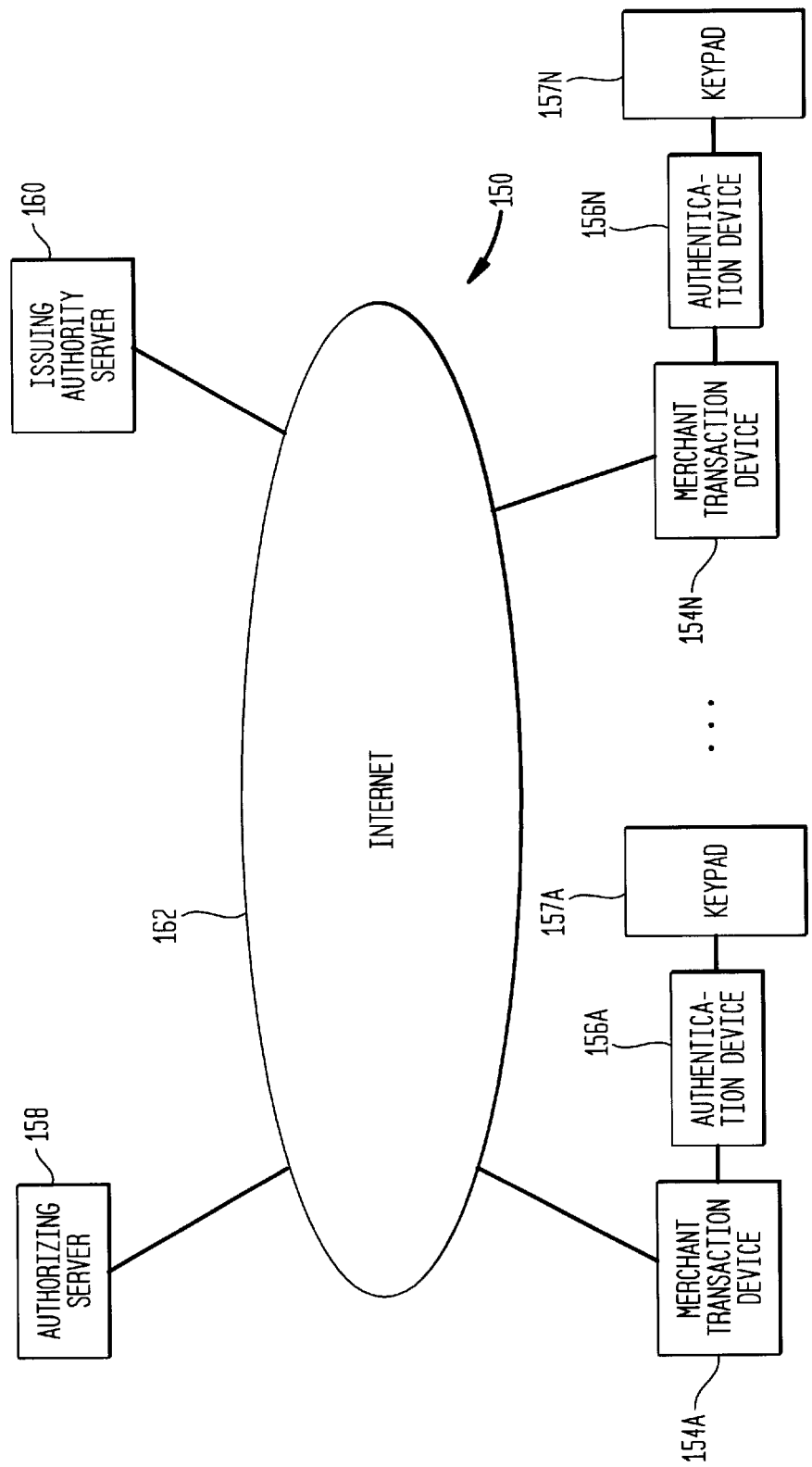
FIG. 2 illustrates an alternative embodiment of a secure transaction system, using a merchant terminal to communicate with an authenticating server over an insecure communication channel according to the present invention.

FIG. 2 illustrates an alternative system 150 for conducting a secure transaction over an insecure communication channel according to the present invention. The system 150 includes a plurality of transaction terminals embodied as merchant transaction devices 154A . . . 154N. Each merchant device 154A . . . 154N may be used to authorize a customer transaction, for example to obtain authorization to issue a charge against a customer credit or debit card. Each of the merchant devices 154A . . . 154N is connected to an authentication device 156A . . . 156N, respectively. Each of the authentication devices 156A . . . 156N is tamperproof, preferably employing a mediametric encryption key created by obtaining and processing numerical representations of trapped charge levels in cells of a semiconductor memory array.

Each authentication device 156A . . . 156N is adapted to receive transaction data from the associated merchant device 154A . . . 154N. Each authentication device 156A . . . 156N may also receive information from a keypad 157A . . . 157N, respectively. The keypads 157A . . . 157N may be used for customer entry of a password or personal identification number (PIN). The merchant devices 154A . . . 154N each communicate with an authorizing server 158. The authorizing server 158 may belong to a bank which has a contractual relationship with a merchant to advance funds as a result of credit or debit transactions, but need not be the issuer of the authentication devices 156A . . . 156N. The authorizing server 158 communicates with an issuing authority server 160. The issuing authority server 160 belongs to an authority, such as a bank, which issued the authentication devices 156A . . . 156N. The issuing authority server 160 communicates with the authorizing server 158 to authenticate the transaction for the authorizing server 158 to allow the authorizing server 158 to authorize a charge. The authorizing server 158 and the issuing authority server 160 may, but need not, belong to the same entity. The Internet 162 is shown here as the communication channel used to transfer information, because it is inexpensive and convenient, but also notoriously insecure. It will be recognized, however, that any of a wide variety of communication channels may be used in practicing the present invention.

When a customer wishes to perform a transaction with a merchant, for example,using the merchant device. 154A, the merchant enters the transaction information into the device 154A. The transaction information entered may include item number, item description, cost, or any other information desired in conducting the transaction. The merchant then asks the customer to place his credit or debit card in the authentication device 156A. The authentication device 156A then reads identifying information from the card and stores the information. Once the authentication device 156A has read the card successfully, it issues a notification that reading occurred successfully and then issues a notification that a PIN or password may be entered, if the transaction calls for entry of a PIN or password. The authentication device 156A reads a PIN or password, if entered, reads transaction information from the merchant device 154A and adds a date and time stamp. The authentication device 156A then reads authentication information from the card. The authentication is preferably mediametric information based on physical characteristics of the card which may be precisely read but difficult or impossible to write or copy predictably. These characteristics include positioning of magnetic transitions on a magnetic stripe card or levels of trapped charges cells of a semiconductor memory array. The mediametric characteristics can be used to create a "fingerprint" of a device such as a magnetic card or a semiconductor memory. The fingerprint can be stored in a location accessible to the issuing authority server 160. Then, when the card is submitted for a transaction, the mediametric characteristics of the card which is submitted can be measured or examined and used for comparison against the stored mediametric fingerprint. Mediametric authentication techniques for magnetic devices are disclosed in the Fernandez U.S. Pat. Nos. 5,235,166, 5,430,279 and 5,616,904 cited above, and mediametric authentication techniques for semiconductor devices are disclosed in the Fernandez U.S. Pat. No. 5,655,636 cited above.

After reading the authenticating characteristics of the card, the authentication device 156A creates an information block which includes the card information, the transaction information, card authentication information and a date and time stamp, as well as any PIN or password entered. The authentication device 156A encrypts the information block using a preprogrammed key entered by an entity controlling the issuing authority server 160. The authentication device 156A passes the encrypted information block to the merchant device 154A. The merchant device 154A transmits the transaction information and the encrypted information block to the authorizing server 158. The authorizing server 158 passes the encrypted information block to the issuing authority server 160. The issuing authority server 160 decrypts the information block using the same encryption key programmed into the authentication device 156A and used to encrypt the information block. The issuing authority server 160 examines the card information and the card authentication information and compares the card authentication information against previously stored card authentication information. If the card authentication information received in the information block matches the stored information, the card is authenticated and a charge is authorized against the account indicated by the card information. The issuing authority server 160 notifies the authorizing server 158 that the charge has been approved and the authorizing server 158 notifies the merchant device 154A that a payment to the merchant has been authorized. The merchant device 154A displays a notice that the transaction has been approved.

The merchant devices 154A . . . 154N, and the authorizing server 158 may communicate over any kind of communication channel desired. Moreover, the authorizing server 158 may send the information block to the issuing authority server 160 over any desired communication channel. A secure channel need not be used because the card identification and authentication information needed to complete the transaction is authenticated and protected by a key which was previously transmitted in a secure way and is maintained in security. However, the issuing authority server 160 and the authorizing server 158 must communicate in a secure way so that an authentication received by the authorizing server 158 will be known to have been issued by the issuing authority server 160. This may be done by maintaining a secure communication channel between the authorizing server 158 and the issuing authority server 160. Alternatively, encryption may be employed for communication between the authorizing server 158 and the issuing authority server 160. The authorizing server 158 and the issuing authority 160 may both be maintained in a secure environment, so that if good security practices and key control are followed, encrypted communication between the authorizing server 158 and the issuing authority 160 may be conducted over an insecure communication channel.

Figure 3:
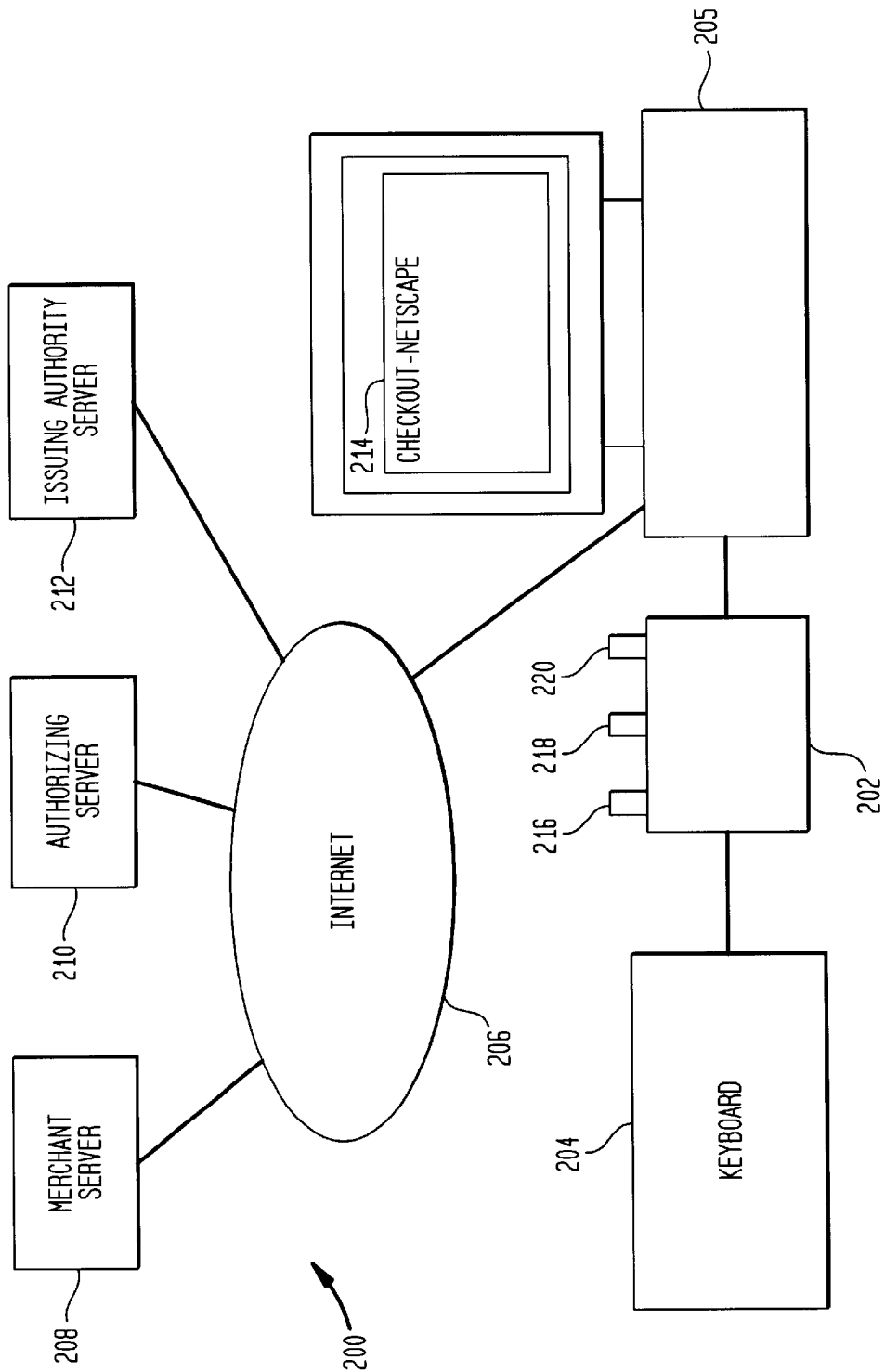
FIG. 3 illustrates an alternative embodiment of a transaction processing system, using a customer computer to communicate with a merchant server over an insecure communication channel according to the present invention.

FIG. 3 illustrates an alternative secure transaction system 200 according to the present invention, useful for authenticating and securing transactions conducted using a customer's home computer to communicate with a merchant through a data connection over a medium such as the telephone or the Internet. The system 200 includes an authentication device 202 which is connected between a keyboard 204 and a personal computer (PC) 205 belonging to a user. The PC 205 is employed as a transaction terminal for communicating transaction and financial information to a remote server. The PC 205 communicates over an insecure channel such as the Internet 206 to a merchant server 208. The merchant server 208 communicates with an authorizing server 210, belonging to an authority such as a bank which advances funds to the merchant as a result of sales transactions. The authorizing server, communicates with an issuing authority server 212. The issuing authority server 212 may suitably belong to an authority which maintains customer accounts and authenticates the validity of transactions involving those customers. Alternatively, the issuing authority server 212 may belong to an authority responsible for authenticating transactions conducted by customers of other institutions, based on information provided by those institutions. Before being issued to a user, the authentication device 202 is programmed with a key by the institution operating the issuing authority server 212. The authentication device 202 is tamperproof so that the key cannot be compromised. The customer shops online using, for example, an Internet browser 214 communicating with the merchant server 208. When the customer has made his or her selections and is ready to complete the transaction, the customer makes an appropriate selection using the browser 214 and the merchant server 208 sends a checkout screen to the browser 214. The customer enters information needed by the merchant, such as shipping information, and the merchant server 208 then sends a request for the customer to enter financial information needed for payment to the merchant. At this point, the customer places a credit card in the authentication device 202. A credit card is used in this example, but it will be recognized that any kind of identifying instrument may be used. Debit cards may be used with the system 200, and if desired by the customer and the institution operating the issuing authority server 212, the customer may be issued a special identifying card authenticating the customer for the purpose of authorizing a direct transfer or other payment to the merchant by the institution operating the issuing authority server 212 or by another bank depending on the issuing authority server 212 to authenticate the transaction. The authentication device 202 reads the information contained on the card, such as the account number, customer name, and other information encoded on the card. The authentication device 202 also reads authentication information from the card, which may be information stored on the card, or which may constitute or be based upon physical characteristics of the card. For example, the authentication device 202 may read magnetic characteristics of a magnetic stripe area of a magnetic card, or charge levels of memory cells of a semiconductor memory card.

The authentication device 202 may suitably contain a red LED 216, which flashes when a card is not successfully read and a green LED 218 which flashes when a card is successfully read. The authentication device 202 also contains a white LED 220 which illuminates when a card has been successfully read and the authentication device 202 is ready to receive a password or PIN from a user. When the authentication device 202 has read and captured the card information and the card authentication information, the authentication device 202 illuminates the green LED 218. When the authentication device 202 is ready to receive password or PIN information, the device 202 illuminates the white LED 220. The customer then enters a password or PIN on the keyboard 204. The authentication device 202 captures the password or PIN information and blocks the information from reaching the customer's PC 205. The authentication device 202 intercepts each character received from the customer's keyboard 204. In the typical case, the authentication device 202 retransmits the characters to the PC 205, but when the authentication device 202 has signaled that it is safe to enter a password or PIN, the authentication device 202 does not retransmit entered characters to the PC 205, but instead captures the characters for processing. Blocking the password or PIN information prevents the information from being compromised.

The authentication device 202 creates an information block including the card information, the card authentication information, the password or PIN, if entered, and adds a date and time stamp. The authentication device 202 may also be adapted or be connected to other devices for the capture of biometric information, such as a signature pad 216. In such a case, the authentication device 202 also includes the biometric information in the information block. The authentication device 202 encrypts the information block with a cryptographic key preprogrammed into the authentication device 202 by the entity controlling the issuing authority server 210. The authentication device passes the encrypted information block to the customer's PC 205, which sends it to the merchant server 208. The merchant server 208 sends the transaction information to the authorizing server 210. The authorizing server 210 receives the transaction information and sends the information block to the issuing authority server 212. The issuing authority server 212 decrypts the information block and examines it to make sure the card was authentic, also examining any password or PIN information to make sure it was correctly entered. If the information block is correct, the issuing authority server 212 sends a message to the authorizing bank 210 instructing the authorizing authority server 210 that it may authorize the transaction and advance funds to the merchant. If the information block is not correct, the issuing bank sends a message to the authorizing authority server 210 instructing the authorizing authority server 210 to reject the transaction.

The authentication device 202 may be adapted to perform authentication of a suitable card without a need to relay the authentication information to the issuing authority server 212. The issuing authority server 212 may issue a self authenticating card bearing authentication information which can be detected by the authentication device 202. The card may also contain an encrypted numerical representation of the authentication information. The numerical representation is encrypted using the encryption key programmed into the authentication device 202 by the entity controlling the issuing authority server 212. If such a card is placed within a suitably designed authentication device 202, the authentication device 202 reads the authentication information from the card to create a numerical authenticator. The authentication device 202 then reads the numerical representation of the authentication information which has been encrypted and placed on the card. The authentication device then decrypts the numerical representation of the authentication information to create a decrypted numerical authenticator. The authentication device 202 compares the numerical authenticator created by examining the authenticating features of the card against the decrypted numerical authenticator. If the numerical authenticator and the decrypted numerical authenticator match within a predetermined range of tolerance, the authentication device 202 produces an authentication certificate and transmits it to the user's PC 205. The user's PC 205 transmits the certificate to the merchant server 208. The merchant's receipt of the certificate establishes that the card is authentic. The merchant server 208 transmits the transaction, together with the certificate, to the authorizing server 210 and the authorizing server 210 can authorize the advance of funds to the merchant without a need to refer the card authentication information to the issuing authority server 212 for authentication. This simplifies processing of transactions, because the merchant is able to trust the authentication of the card and an entity relying on the authorizing server 210 is also able to trust the authentication of the card, even though neither the merchant nor the authorizing server 210 has the original information used to authenticate the card.

A single authentication device 202 and PC 205 are shown here, but it will be recognized that many similar combinations of a PC and an authentication device may be employed in the context of the system 200, with each PC and authentication device gathering and communicating information as described above in connection with the authentication device 202 and the PC 205.

Figure 4:
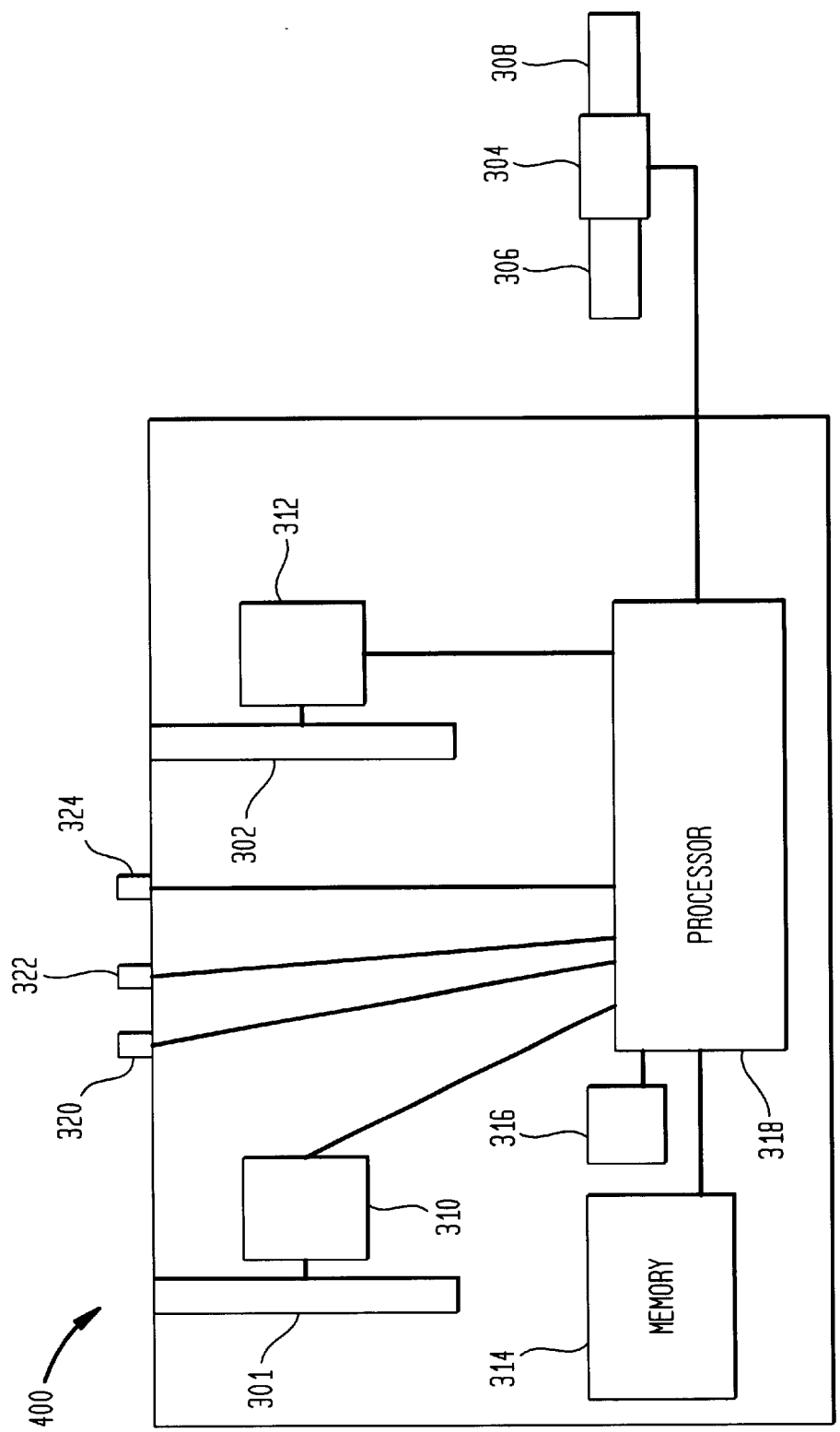
FIG. 4 illustrates an authentication device according to the present invention.

FIG. 4 illustrates a card reader 300 which may be employed as one of the authentication devices 106A . . . 106N of FIG. 1 or the authentication device 202 of FIG. 2. The card reader 300 is adapted to accommodate a financial or other identification card, which may be a magnetic stripe card or a semiconductor card containing information stored in an electronic chip such as an EEPROM. The card reader 300 includes a magnetic card slot 301 for inserting a magnetic card and a semiconductor card slot 302 for inserting a semiconductor card. The card reader 300 includes a keyboard port 304, which allows a keyboard or other data entry device to be connected to the card reader 300. The keyboard port 304 includes a keyboard connector 306, to allow keyboard connection to the card reader 300, and a device connector 308, which allows the card reader 300 to be connected to a device such as a PC or a merchant device, while allowing keyboard inputs received from the keyboard connector 306 to be passed along to the PC or merchant device through the device connector 308. The card reader 300 includes a magnetic stripe reader 310 and a chip reader 312, a memory 314, a data storage area 316 containing a stored key and other information, and a processor 318. The card reader also includes a red LED 320, a green LED 322 and a white LED 324.

When a card is to be authenticated, the user places the card into one of the slots 301 or 302, depending on whether the card is a magnetic stripe card or a semiconductor card. Depending on whether the card is a magnetic stripe card or a semiconductor card, the card is read by the magnetic stripe reader 310 or the chip reader 312. Information read from the card is stored in the memory 314. At the same time, authentication information is retrieved from the reading of the card. Preferably, the authentication information includes mediametric information unique to the card which is detected during the process of reading the card and stored in the memory 314 along with the stored information read from the card. In the case of a magnetic card, the mediametric information may include placement of areas of magnetization on the card. In the case of a semiconductor card, the mediametric information may include measurements of charge levels trapped in cells within an EEPROM within the semiconductor card. If the card has not been read successfully, the processor 320 causes the red LED 318 to be illuminated. If the card is read successfully, the processor 320 retrieves the stored information read from the card together with the authentication information retrieved from the card, and causes the green LED to be illuminated. The processor 320 then prepares for acceptance of a password or PIN to be input by the user. In order to do this, the processor 320 blocks inputs received at the keyboard connector 306 from being transferred to the device connector 308 and illuminates the white LED 322. This maintains the security of the user's password or PIN because the password or PIN is stopped at the card reader 300 and does not pass beyond the card reader 300. Illumination of the white LED 322 indicates that the password or PIN will be blocked and that it is safe to make an entry. When inputs from the keyboard connector 306 are no longer blocked from the device connector 308, the white LED is no longer illuminated, indicating that it is no longer safe to enter a password or PIN.

After receiving any entry of a password or PIN, the processor 318 constructs an information block containing information read from the card, authentication information and date and time stamp. The processor 318 then retrieves a preprogrammed encryption key and uses the encryption key to encrypt the information block to create an encrypted information block. The card reader 300 then transfers the information block to an attached device such as a customer PC or merchant terminal, using the device connector 308.

Figure 5:
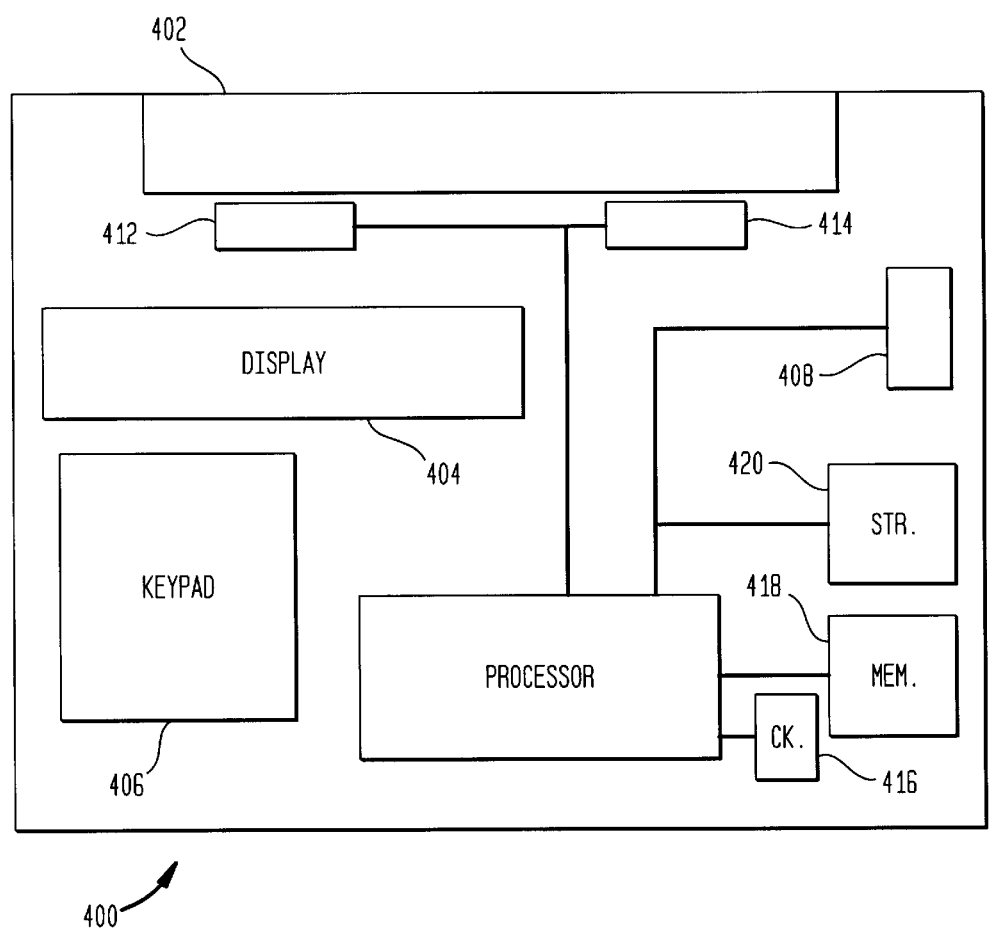
FIG. 5 illustrates an alternative authentication device according to the present invention.

FIG. 5 illustrates a handheld card reader 400 according to the present invention. The device 400 may be used in place of the device 300 of FIG. 3. The reader 400 includes a slot 402 for inserting a card, a display 404 and a keypad 406. The reader 400 also includes a wireless interface 408. The wireless interface 408 may be an infrared interface suitable for communicating with a suitably equipped computer or other device.

The card reader 400 includes a magnetic stripe reader 412 and chip reader 414 for reading a magnetic stripe or semiconductor chip. The card reader 400 also includes a clock/calendar 416, memory 418, data storage area 420 and processor 422 When a user wishes to employ the card reader 400 to authenticate a transaction, the user passes a card through the reader 400. The reader 400 reads information stored on the card by using the magnetic stripe reader 412 or chip reader 414, as appropriate. The processor 422 stores the information in the memory 418. The reader 400 also captures and stores authentication information such as mediametric information uniquely associated with the card. If called for by the transaction, the user may then enter a password or PIN using the keypad 416.

After the card has been read and any password or PIN entered, the processor 422 retrieves the data read from the card and the authentication information captured from the card. The processor 422 adds a date and time stamp and any password or PIN which has been entered, forming an information block. The processor then retrieves a preprogrammed encryption key from the storage area 418 and encrypts the information block using the key. The encrypted information block has the form of a number, which is displayed by the processor using the display 404. The user can enter the number from the display into a transaction terminal, or can allow a merchant to enter the number. Alternatively, the number may be transmitted directly to a transaction terminal by using the wireless interface 408.

When the number is received at a transaction terminal, it is then transmitted to an authenticating server. The authenticating server has the encryption key previously programmed into the card reader 400. Using the key, the authenticating server is able to decrypt the number displayed or transmitted to retrieve the information block created by the processor 422.

Figure 6:
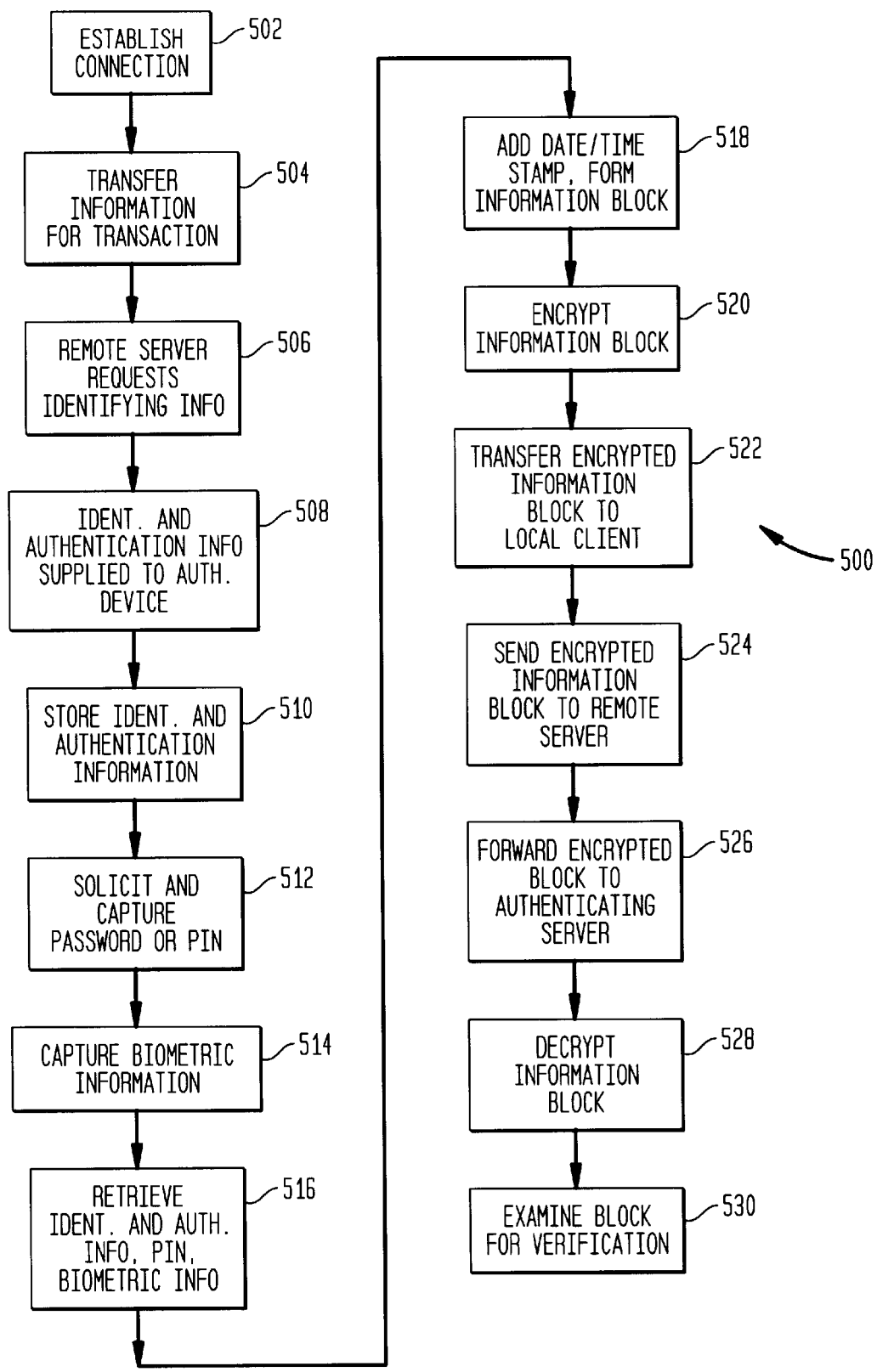
FIG. 6 illustrates a process for transaction authentication according to the present invention.

FIG. 6 illustrates a process 500 of transaction processing according to the present invention. At step 502, a connection is made between a local terminal and a remote server. Any number of different combinations of local terminal and remote server may be employed, for example, a merchant transaction terminal may connect to a bank server, a customer PC may connect to a merchant web site server in order to conduct an online purchase transaction, or a client workstation belonging to a computer network may connect to a network server. At step 504, information is transferred between local terminal and the remote server in order to conduct a transaction. For example, a customer may use a PC connected to a merchant web site server to make selections and prepare to complete a transaction in order to purchase the items selected. At step 506, the remote server requests identifying information from the local terminal. At step 508, identifying and authentication information is supplied to an authentication device. This may be done, for example, by presenting an identification token such as a credit or debit card, or other identification card such as an employee identification, to the authentication device. The identifying information may include information stored on the card, such as account number, privileges, expiration date, or any other suitable information. The authentication information may suitably include unique characteristics of the token, such as mediametric characteristics of information storage media contained on the token. The mediametric characteristics may, for example, include locations of magnetic information stored on a magnetic stripe or levels of trapped charges within cells of an EEPROM contained in a semiconductor card.

At step 510, the identifying and authentication information is stored within the authentication device. At step 512, a password or PIN is solicited from the user, and captured and stored within the authentication device. At step 514, biometric information such as a fingerprint or signature is captured by a suitable reader attached to the authentication device and stored within the authentication device.

At step 516, the identifying information and authentication information is retrieved, along with the password or PIN and the biometric information. At step 518, a date and time stamp is added to the retrieved information and the retrieved information, together with the date and time stamp, is formed into an information block. At step 520, the information block is encrypted using a key provided by an authenticating authority. At step 522, the encrypted information block is transferred to the local client. At step 524, the local client sends the encrypted information block to the remote server, along with any other information which the remote server needs to receive in order to complete the transaction. At step 526, the encrypted information block is forwarded to an authenticating server. At step 528, the authenticating server decrypts the encrypted information block to recover the original information block. At step 530, the authenticating server examines the information block and compares the identification and authentication information against stored identification and authentication information in order to verify the information block. If verification of the information block is successful, the authenticating server sends a certificate to the remote server authorizing the transaction. If verification of the information block fails, the authenticating server instructs the remote server to reject the transaction.

Figure 7:
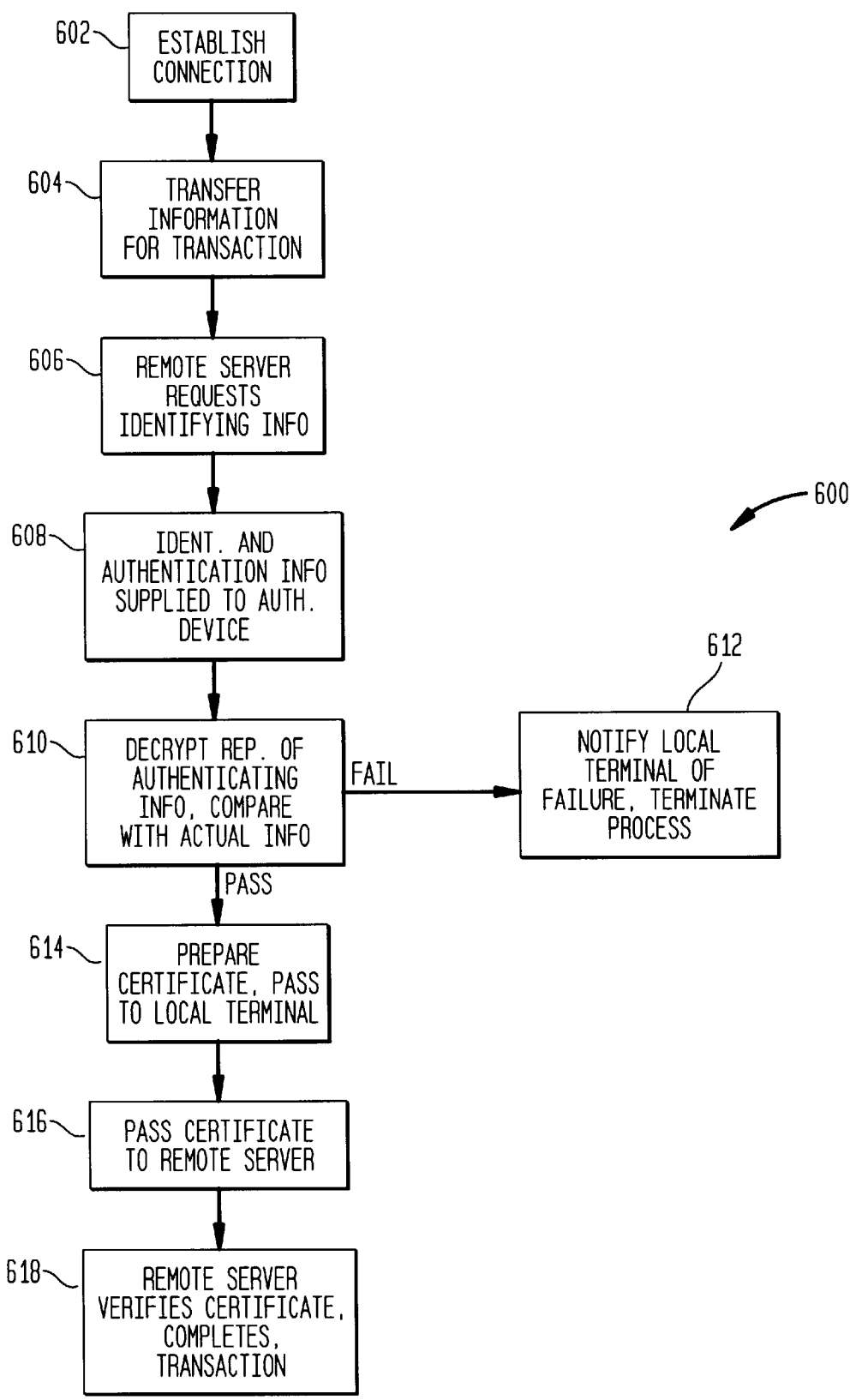
FIG. 7 illustrates an alternative process for transaction authentication according to the present invention.

FIG. 7 illustrates a process 600 of transaction processing according to an alternative aspect of the present invention. The process 600 employs a self-authenticating token, whose use allows authentication of a transaction without a need for an information block to be transmitted to an authenticating server. At step 602, a connection is made between a local terminal and a remote server. At step 604, information is transferred between local terminal and the remote server in order to conduct a transaction. At step 606, the remote server requests identifying information from the local terminal. At step 608, identifying and authentication information is supplied to an authentication device, preferably by presenting an identification token such as a credit, debit or other identification card, to the authentication device. The authentication information on the token may include unique characteristics of the token, such as mediametric characteristics of information storage media contained on the token. The mediametric characteristics may, for example, include locations of magnetic information stored on a magnetic stripe or levels of trapped charges within cells of an EEPROM contained in a semiconductor card. In addition, the token includes a numerical representation of the mediametric characteristics, encrypted using a key provided by an authentication authority and stored on the token.

At step 610, the authentication device decrypts the encrypted representation of the authentication information and compares it to the authentication information read from the token, in order to verify the token. If the token fails verification, the process proceeds to step 612, the authentication device notifies the local terminal that the token fails verification, and the process terminates. If the token passes verification, the process proceeds to step 614 and the authentication device prepares a certificate authorizing the transaction and passes it to the local terminal. The certificate may include transaction information and date and time stamp, but does not include any private information entered by the user or retrieved from the token.

At step 616, the local terminal passes the certificate to the remote server. At step 618, The remote server verifies the certificate and proceeds to complete the transaction.

While the present invention is disclosed in the context of a presently preferred embodiment, it will be recognized that a wide variety of implementations may be employed by persons of ordinary skill in the art consistent with the above discussion and the claims which follow below.

I claim:

1. A method of transaction processing, comprising:
   receiving a unique combination of identifying and authentication information from a unique token, the combination of identifying and authentication information including information relating to physical characteristics of the token;
   forming an information block comprising the identifying and authentication information;
   encrypting the information block to form an encrypted information block;
   receiving the encrypted information block at an authenticating server;
   decrypting the encrypted Information block to form a decrypted information block;
   extracting the identifying and authentication information from the decrypted information block; and
   comparing the extracted identifying and authentication information against stored identifying and authentication information uniquely matching identifying and authentication information associated with an authentic token to verify the transaction.

2. The method of claim 1 wherein the information block is transferred to an authorizing server operative to authorize the transaction upon determining that the information block is authentic and wherein the authenticating server provides an authentication decision to the authorizing server.

3. The method of claim 2 wherein the information block is produced by a tamperproof authentication device operative to receive the token and to receive the identifying and authentication information from the token, the authentication device being preprogrammed with an encryption key also available to the authenticating server, the authentication device using the encryption key to encrypt the information block.

4. The method of claim 3 wherein the authentication device provides the information block to a merchant terminal and wherein the merchant terminal transfers the information block to the authorizing server.

5. The method of claim 4 wherein the authentication device also receives a personal identification number and wherein the authentication device includes the personal identification number in the information block.

6. The method of claim 3 wherein the authentication device provides the information block to a customer personal computer and wherein the customer personal computer transfers the information block to a merchant server.

7. A transaction authorization system, comprising:
   a transaction processing device for receiving and formatting transaction information;
   an authentication device for receiving a unique token, the authentication device being operative to receive a unique combination of identifying and authentication information from the token, the combination of identifying and authentication information including information relating to physical characteristics of the token, the authentication device being operative to construct and encrypt an information block comprising the identifying and authentication information and transfer the information block to a merchant terminal;
   an authorizing server for receiving the transaction information and the information block and authorizing or rejecting the transaction based on the authenticity of the information block; and
   an authenticating server for receiving and decrypting the information block and comparing the information block against identifying and authentication information accessible to the server and uniquely matching identifying and authentication information associated with an authentic token and authenticating or rejecting the information block based on the results of the comparison.

8. The system of claim 7 wherein the transaction processing device is a merchant terminal.

9. The system of claim 7 wherein the transaction processing device is a personal computer.

10. A method of transaction processing, comprising:
    receiving a unique combination of identifying and authentication information from a unique token, the combination of identifying and authentication information including information relating to physical characteristics of the token;

receiving from the token an encrypted numerical representation of the authentication information, the encrypted numerical representation being stored on the token;

decrypting the encrypted numerical representation of the authentication information;

comparing the authentication information with the numerical representation of the authentication information; and authorizing or rejecting the transaction based on a result of comparing the authentication information with the numerical representation of the authentication information.

11. An authentication device comprising:

an interface for communicating with a transaction processing device;

a reader for receiving a unique combination of identifying and authentication information from a unique token, the combination of identifying and authentication information including information relating to physical characteristics of the token;

storage for storing a preprogrammed encryption key; and a processor for receiving the identifying and authentication information from the reader and for receiving transaction information from the transaction processing device, forming an information block comprising the identifying and authentication information, encrypting the information block, and transferring the information block to the transaction processing device.

12. The authentication device of claim 11 wherein the reader is operative to read a numerical representation of actual authentication information from the token and also to read the actual information from the token and wherein the processor is operative to compare the numerical representation of the authentication information against the actual authentication information and to grant or refuse a transaction certificate to the transaction processing device based on the result of the comparison.

13. An authentication device comprising:

a reader for receiving a unique combination of identifying and authentication information from a unique token, the combination of identifying and authentication information including information relating to physical characteristics of the token;

a user interface for receiving transaction information;

memory for storing a preprogrammed encryption key;

a processor for receiving the identifying and authentication information from the reader and the transaction information from the user interface and combining the identifying and authentication information to form an information block, the processor being further operative to encrypt the information block using the preprogrammed encryption key and to create a numerical representation of the encrypted information block; and a display for displaying the numerical representation of the encrypted information block.

14. The authentication device of claim 13 and also including a communication interface for communicating with a transaction processing device.

15. The authentication device of claim 14 wherein the communication interface is a wireless interface.

16. The authentication device of claim 15 wherein the communication interface is a wireless infrared interface.

* * * * *